No. 770,858. PATENTED SEPT. 27, 1904.
R. C. HORNUNG.
TROLLING SPOON.
APPLICATION FILED JUNE 15, 1904.
NO MODEL.
FIG. 1.
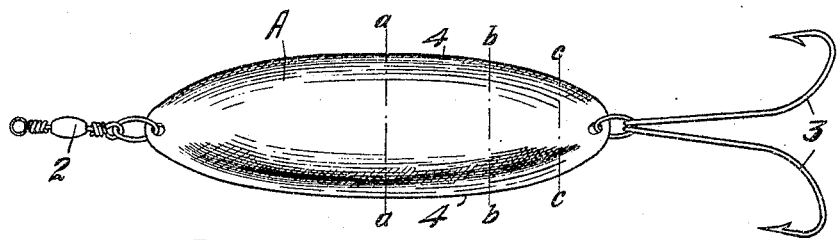
FIG. 2.
FIG. 3. FIG. 4. FIG. 5.
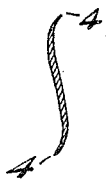  
FIG. 6.
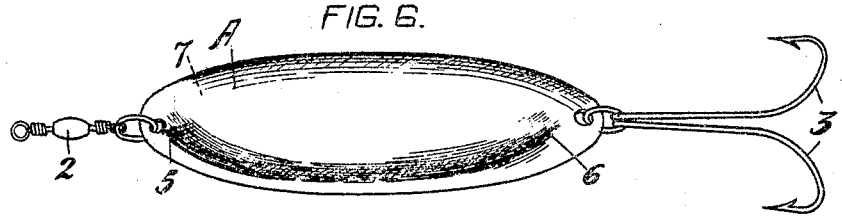
FIG. 7.
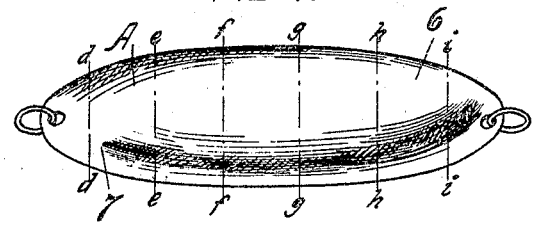
FIG. 8. FIG. 9. FIG. 10. FIG. 11. FIG. 12. FIG. 13.
     
WITNESSES.
Chas. E. Chapin.
INVENTOR,
Rudolph C. Hornung
By Geo. H. Strong.
Atty No. 770,858. Patented September 27, 1904.

UNITED STATES PATENT OFFICE.

RUDOLPH C. HORNUNG, OF SAN FRANCISCO, CALIFORNIA.

TROLLING-SPOON.

SPECIFICATION forming part of Letters Patent No. 770,858, dated September 27, 1904.

Application filed June 15, 1904. Serial No. 212,678. (No model.)

*To all whom it may concern:*

Be it known that I, RUDOLPH C. HORNUNG, a citizen of the United States, residing in the city and county of San Francisco and State of California, have invented new and useful Improvements in Trolling-Spoons, of which the following is a specification.

My invention relates to improvements in fishing or trolling spoons. Its object is to provide a lure or decoy of simple construction which will generally simulate the movements and characteristics of such fish as are preyed upon by other fish and which will maintain such simulation whether the trolling - boat moves fast or slow through the water.

The trouble with the spoons generally on the market is that they either spin too rapidly when the boat goes fast or do not spin at all when the boat goes slow or are subject to both defects, and instead of attracting fish rather scare the fish away.

The invention consists of the parts and the construction and combination of parts, as hereinafter more fully described and claimed, having reference to the accompanying drawings, in which—

Figure 1 is a plan view of one form of my spoon in which both sides are symmetrical. Fig. 2 is an edge view of same. Figs. 3, 4, 5 are respective sections on lines $a\,a$, $b\,b$, $c\,c$ of Fig. 1. Figs. 6, 7 are plan views of opposite sides of a slightly modified form of my invention. Figs. 8 to 13, inclusive, are respective sections on lines $d\,d$, $e\,e$, $f\,f$, $g\,g$, $h\,h$, $i\,i$, Figs. 6, 7.

A represents a metal plate forming the body of my improved spoon, which is generally oblong in appearance, with gracefully tapered and rounded symmetrical ends. The outline of the spoon is more especially that of a flattened ellipse. One end of the spoon is provided with the usual swivel connection 2 for attachment to a snell or line and the other end is furnished with the usual hooks 3. The novelty resides in the peculiar curving of plate A.

As shown in Figs. 1 and 2, the lateral edges of the plate are slightly turned up along nearly their entire length, as indicated at 4, one in one direction and one in the other, and the ends of the plate are given a slight twist in opposite directions and in continuation of and conformable with the upturned lateral edges, with the consequent result that while there is a considerable central elliptical area, as represented by the unshaded portion, that remains in approximately the same plane the plate on its minor axes or transverse diameters is essentially ogee in form, as plainly seen in Figs. 3, 4, 5, and 8 to 13, inclusive. In fact it may be said that the dominant characteristic of this spoon is that on all cross-sections taken substantially at all or nearly all points along its length it is essentially ogee in form. This construction is to be differentiated from those spoons which are ogee in form essentially in the direction of their length. It is to be noted further that this dishing of the side edges and twisting the ends of the plate gives a graceful curve to the edges of the plate distinguished as being concaved in the middle and convexed at each end, as indicated in Fig. 2.

The spoon of Figs. 6 and 7 differs only from that of Figs. 1 and 2 in that the lateral dish given the spoon begins at or approximate to the swivel, as indicated at 5, on one side, but runs out just before it reaches the hook end of the plate, as indicated at 6, while on the opposite side of the plate the dish begins at a little distance from the swivel, as represented at 7, and continues unto the very end, where the hooks are attached. By this construction the water begins to act on one side, as at 5, at a point nearer the swivel than on the other side, but the influence of the water on this latter side is continued clear to the hook end.

The tendency of a spoon constructed as herein described has been found to be for it to keep spinning in the water no matter how slow the boat goes and at the same time for it not to spin too rapidly should the boat go fast. This latter tendency I attribute to the lateral central longitudinal dish or concavity noted in Fig. 2, whereby a sort of long shallow pocket is formed on the two sides of the spoon, which act when the spoon is drawn rapidly through the water as a suction or drag on the water in opposition to the general tendency of the spoon to spin. At the same time the spoon does not tend to dart erratically from side to side, but to travel in a more nearly natural and straight line behind the boat, and in case the boat stops the oppositely-curved edges of the plate cause the spoon to keep turning even in settling to the bottom by gravity. The spoon in settling to the bottom will not fall dead nor skid on zigzag or inclined planes, but will fall more nearly straight and keep rotating.

Having thus described my invention, what I claim, and desire to secure by Letters Patent, is—

1. A trolling-spoon of elongated form essentially ogee shape in cross-section.

2. A trolling-spoon having the form of an ellipse, slightly twisted at the ends, and generally ogee in cross-section throughout its length.

3. A trolling-spoon having the form of a flattened ellipse and generally ogee in cross-section.

4. A trolling-spoon having the form of a flattened ellipse and generally ogee in cross-section, the ends of the spoon being oppositely twisted.

5. A trolling-spoon having the form of a flattened ellipse and generally ogee in cross-section, the ends of the spoon being slightly twisted in opposite directions.

6. A trolling-spoon generally elliptical in outline with the lateral edges upturned in opposite directions substantially throughout their length.

7. A trolling-spoon generally elliptical in outline with the lateral edges upturned in opposite directions substantially throughout their length, the end of the spoon being oppositely twisted in conformation with the upturned edges.

8. A trolling-spoon generally oblong in appearance with curved symmetrical ends, a portion of the spoon, intermediate of its ends having oppositely-upturned edges and essentially ogee in form in the direction of its width.

In testimony whereof I have hereunto set my hand in presence of two subscribing witnesses.

RUDOLPH C. HORNUNG.

Witnesses:
V. S. HORNUNG,
B. P. MALLATRATT.